March 15, 1938. F. MÜNZINGER 2,111,435
ELASTIC FLUID POWER PLANT FOR AIRCRAFT
Filed Dec. 8, 1936
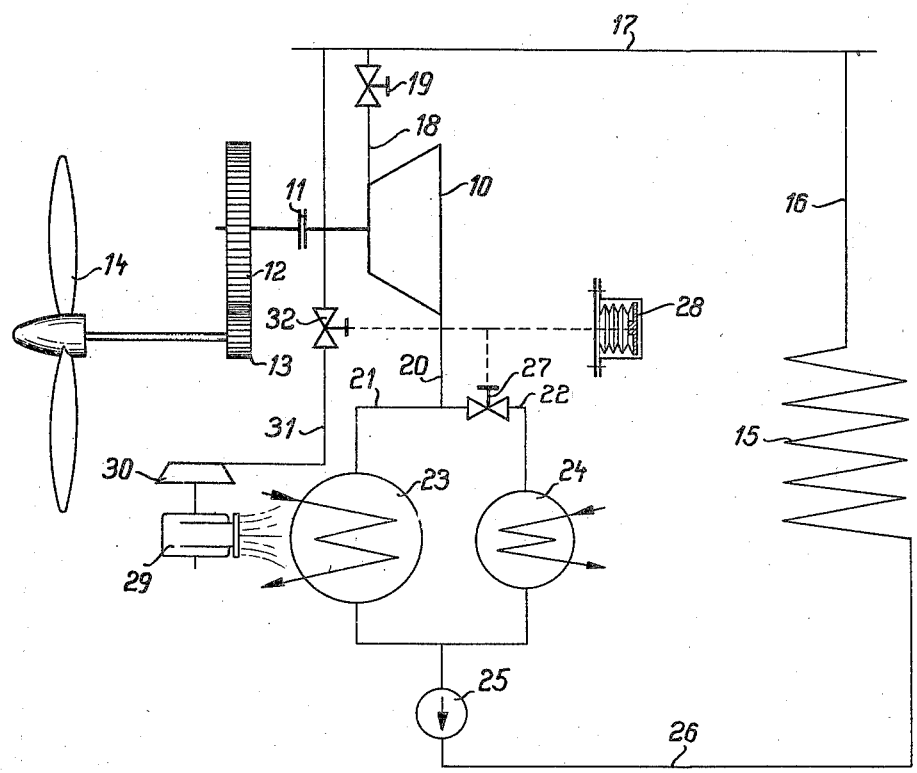
Inventor
Friedrich Munzinger
By Harry E. Dunham
Attorney Patented Mar. 15, 1938

2,111,435

UNITED STATES PATENT OFFICE 2,111,435

ELASTIC FLUID POWER PLANT FOR AIRCRAFT

Friedrich Münzinger, Charlottenburg, Germany, assignor to General Electric Company, a corporation of New York Application December 8, 1936, Serial No. 114,843
In Germany December 14, 1935

5 Claims. (Cl. 60—96)

The present invention relates to elastic fluid power plants for aircraft. The output of elastic fluid power plants, such as steam power plants, in aircraft is considerably decreased at high altitudes due to the drop of the vacuum in the condenser whenever a certain flying altitude is exceeded. To be sure, the temperature drop of the outer air, which occurs with increasing altitude, has a favorable influence on the condenser performance, the vacuum remaining the same. However, this favorable influence is offset by the fact that the density of the air likewise decreases. Moreover, at altitudes of about 10 km., the air temperature is nearly constant, so that from that altitude on the temperature drop between external air and condenser no longer increases.

Therefore ordinary power plant arrangements would necessitate large condensers to attain a good vacuum at high altitudes. Such condensers, however, would be heavy and would increase considerably the flight resistance and, in this manner, offset at least partly the advantage of flying at high altitudes. At high altitudes, on the other hand, the difference between the pressure in the condenser, when the desired vacuum is attained, and the pressure of the external air is only slight or even zero.

The object of my invention is to provide an improved elastic fluid power plant for aircraft whereby the above-mentioned difficulties are overcome. This is accomplished by the provision of two condensers, one of which is effective only at high altitudes. As a result, one can obtain at high altitudes not only the same output as on the ground, but a larger output, since the substantial increase of the cooling surfaces makes it possible to increase the vacuum in the condenser.

The difference between the pressure in the normal condenser and the atmosphere will either be below or above a certain amount. Moreover, provisions may be made by means of which, in certain altitudes, say above 10 km., the vacuum is kept lower than on the ground.

If the condenser, which operates alone at medium altitudes, is provided with a device for improving the cooling effect, for instance with a blower or a propeller, an additional regulation of the condenser capacity may be obtained by shutting off the cooling device at high altitudes, or by operating it at a lower speed than at medium altitudes.

For a consideration of what I believe to be novel and my invention, attention is directed to the following description and the claims appended thereto in connection with the accompanying drawing.

The drawing shows diagrammatically a power plant for aircraft embodying the invention.

The steam turbine 10 drives by means of a coupling 11 and a step-up gear 12, 13 the propeller 14 of the aircraft. The steam for this turbine is delivered by the steam generator 15, which is connected to the turbine by the steam-piping 16, 17, 18. The pipe 18 is provided with the regulating valve 19. The exhaust end of the turbine 10 is connected by the pipes 20, 21, 22 to the main condenser 23 and the auxiliary condenser 24 and condensate from these condensers is pumped by a pump 25 through the pipe 26 to the steam generator 15. The pipe 22 connecting the auxiliary condenser 24 to the exhaust pipe 20 is provided with a valve 27, which is automatically regulated by a bellows-diaphragm 28 subjected to the pressure in the atmosphere. A blower 29 driven by the auxiliary turbine 30 serves as an additional cooler for the main condenser 23. The turbine 30 is connected by the pipe 31 to the main steam pipe 17, the pipe 31 being provided with a valve 32, which is also automatically regulated by the bellows-diaphragm 28.

At medium altitudes the regulating valve 27 of the auxiliary condenser 24 is closed, so that the main condenser 23 operates alone. Above a certain height the diaphragm 28 as a result of the reduction of the pressure in the atmosphere opens the valve 27 and the exhaust steam of the turbine 10 is now condensed also in the auxiliary condenser. The cooling effect is increased and so also the output is increased. An additional regulation of the cooling effect and so of the output may be obtained by the automatic regulation of the valve 32. If the valve 32 is for example opened by the diaphragm 28 the supply of steam to the turbine 30 and so the blower output are increased, as result thereof also the cooling effect of the main condenser 23 is increased.

What I claim as new and desire to secure by Letters Patent of the United States is:

1. An elastic fluid power plant for aircraft including an elastic fluid engine, a main condenser for condensing elastic fluid discharged from the engine, and an auxiliary condenser for receiving elastic fluid from the engine at high altitudes only, and means for automatically connecting the auxiliary condenser to the engine at a certain altitude.

2. An elastic fluid power plant for aircraft including an elastic fluid engine, a main condenser for condensing elastic fluid discharged from the engine, an auxiliary condenser, and means for automatically connecting and disconnecting the auxiliary condenser in parallel with the main condenser in response to certain changes in atmospheric pressure conditions.

3. An elastic fluid power plant for aircraft including an elastic fluid engine, a main condenser for condensing elastic fluid discharged from the engine, an auxiliary condenser, and means including a barometric pressure-responsive device for automatically connecting and disconnecting the auxiliary condenser in parallel with the main condenser in response to a predetermined external pressure.

4. An elastic fluid power plant for aircraft including the combination of an elastic fluid engine, a main condenser for condensing elastic fluid discharged from the engine, an auxiliary condenser, means for connecting the auxiliary condenser in parallel with the main condenser, a blower for cooling the main condenser, an auxiliary engine driving the blower, and means for conducting elastic fluid to the auxiliary engine and for controlling such engine in response to changes in atmospheric pressure conditions.

5. An elastic fluid power plant for aircraft including the combination of an elastic fluid engine, a main condenser connected to the engine for condensing elastic fluid exhausted therefrom, an auxiliary condenser, means for connecting the auxiliary condenser in parallel with the main condenser at high altitudes, means including a blower for cooling the main condenser at low and medium altitudes, and means for automatically reducing the speed of the blower and disconnecting it at high altitudes.

FRIEDRICH MÜNZINGER.